United States Patent
Sibbach et al.

(10) Patent No.: US 12,552,112 B2
(45) Date of Patent: Feb. 17, 2026

(54) AUTOMATED FIBER PLACEMENT ASSEMBLY

(71) Applicant: GENERAL ELECTRIC COMPANY, Schenectady, NY (US)

(72) Inventors: Arthur William Sibbach, Boxford, MA (US); Nicholas Joseph Kray, Mason, OH (US); Elzbieta Kryj-Kos, Liberty Township, OH (US); Douglas Lorrimer Armstrong, Needham, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/436,703

(22) Filed: Feb. 8, 2024

(65) Prior Publication Data
US 2025/0256470 A1    Aug. 14, 2025

(51) Int. Cl.
*B29C 70/38* (2006.01)
*B29L 31/00* (2006.01)

(52) U.S. Cl.
CPC ..... *B29C 70/384* (2013.01); *B29L 2031/7504* (2013.01)

(58) Field of Classification Search
CPC ... B29C 70/384; B29C 70/386; B29C 70/382; B29L 2031/7504
See application file for complete search history.

(56) References Cited

U.S. PATENT DOCUMENTS

| | | | |
|---|---|---|---|
| 3,687,764 A | 8/1972 | Rogosch et al. | |
| 4,990,213 A | 2/1991 | Brown et al. | |
| 8,282,758 B2 | 10/2012 | Van Nieuwenhove et al. | |
| 8,327,743 B2 | 12/2012 | McCowin | |
| 8,522,849 B2 | 9/2013 | Van Nieuwenhove et al. | |
| 10,391,726 B2 | 8/2019 | Jeon | |
| 10,730,246 B2 | 8/2020 | Iwata et al. | |
| 11,007,675 B2 | 5/2021 | Miyoshi et al. | |

(Continued)

FOREIGN PATENT DOCUMENTS

| CN | 116979160 A | * 10/2023 | ........ H01M 10/0525 |
|---|---|---|---|
| EP | 2454081 B1 | 9/2013 | |

(Continued)

OTHER PUBLICATIONS

Boon et al., Recent Advances on the Design Automation for Performance-Optimized Fiber Reinforced Polymer Composite Components, Journal of Composites Science, May 29, 2020, vol. 4(2). 61, MDPI, www.mdpi.com/, Basel, Switzerland.

(Continued)

*Primary Examiner* — S. Behrooz Ghorishi
(74) *Attorney, Agent, or Firm* — Venable LLP; Andrew W. Bradshaw; Michele V. Frank

(57) ABSTRACT

The disclosure herein provides an automated fiber placement assembly for forming a component, such as for a turbine engine or non-turbine engine system, by the placement of separate layers or strips of fiber tows. The automated fiber placement assembly comprises a heated pressure roller to heat the strip of fiber tows as they are placed during formation of the component. The pressure roller can be heated to heat the strip of fiber tows, or an alternate roller, separate from the pressure roller, can be heated to heat the strip of fiber tows.

20 Claims, 8 Drawing Sheets

(56) References Cited

U.S. PATENT DOCUMENTS

| | | |
|---|---|---|
| 11,214,022 B2 | 1/2022 | Kisch et al. |
| 11,458,694 B2 | 10/2022 | Nishimura et al. |
| 11,473,223 B2 | 10/2022 | Oberste et al. |
| 11,518,116 B2 | 12/2022 | Samejima et al. |
| 2008/0169579 A1 | 7/2008 | Mueller-Hummel et al. |
| 2011/0011537 A1* | 1/2011 | Hamlyn ................ B29C 70/384 |
| | | 156/436 |
| 2012/0251823 A1 | 10/2012 | Maldonado et al. |
| 2018/0036936 A1 | 2/2018 | Tan et al. |
| 2018/0194040 A1* | 7/2018 | Barnes ................... B29C 70/32 |
| 2019/0389148 A1 | 12/2019 | Wadsworth |
| 2020/0047435 A1* | 2/2020 | James ................... B29C 70/542 |
| 2020/0376780 A1* | 12/2020 | Kim ...................... B29C 70/543 |
| 2022/0234311 A1* | 7/2022 | Berastegui .............. B29C 70/56 |
| 2024/0092040 A1* | 3/2024 | Babeau ................. B29C 70/386 |

FOREIGN PATENT DOCUMENTS

| | | |
|---|---|---|
| EP | 2952316 B1 | 10/2017 |
| JP | 94039133 B2 | 2/1992 |
| WO | 2009023023 A1 | 2/2009 |

OTHER PUBLICATIONS https://www.researchgate.net/figure/Schematic-of-the-automated-fiber-placement-process_fig1_341844335, accessed Dec. 4, 2023.

\* cited by examiner

AUTOMATED FIBER PLACEMENT ASSEMBLY

TECHNICAL FIELD

The present disclosure relates generally to an automated fiber placement assembly for forming composite parts, and particularly, to a system for applying strips of fiber tows to a substrate during fiber placement.

BACKGROUND

Many components, such as those for a turbine engine, are made from composite materials that can include a fiber-reinforced matrix and exhibit a high strength-to-weight ratio. Due to the high strength to weight ratio and moldability to adopt relatively complex shapes, composite materials are utilized in various applications. Components made from composite materials can be used in aviation applications, for example, such as forming at least a portion of the fuselage and/or wings, rudder, manifold, turbine engine, airfoil, blades, vanes, or other components of the aircraft.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
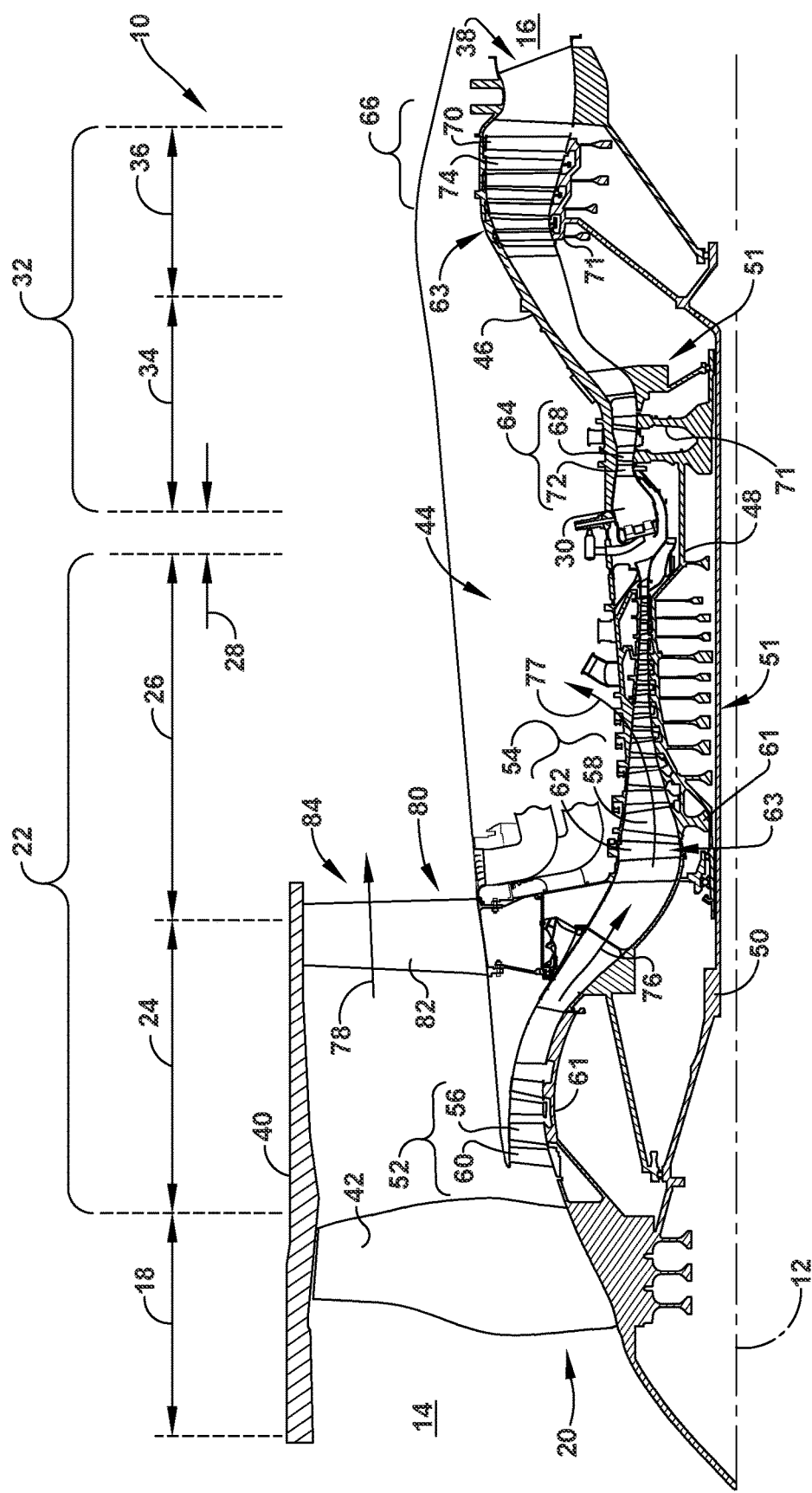
FIG. 1 is a schematic cross-sectional view of a turbine engine in accordance with an exemplary aspect of the present disclosure.

Aspects of the disclosure herein are directed to a system and method for forming a component, such as a component for a turbine engine, or any other components that can be fully or partially formed by automated fiber placement (AFP) assemblies or machines. Automated fiber placement machines can be used to lay successive layers of fiber tows to build upon a substrate or add to a component. Strips of fiber tows used to build the component can be impregnated with adhesive materials, such as resins in one non-limiting example. Heat and pressure application to the resins or adhesive materials can improve bond and adhesion between the strips of fiber tows being applied and the underlying substrate upon which the fiber tows are applied. Heating of a pressure roller used to apply the strips of fiber tows can provide specific, controlled, or increased heat and pressure in order to form an improved bond or improved adhesion among the applied strips of fiber tows and the underlying substrate or component.

As described herein, the automated fiber placement assembly can be used to form components or apply fiber tows during the forming of components, such as engine components used in a turbine engine for an aircraft. Such engine components can be an airfoil, for example, such as for a fan blade. It should be understood that the disclosure can apply similarly to other components of the turbine engine, such as a combustor liner or a disk in non-limiting examples, as well as non-aircraft or non-engine components. While described in terms of a component for a turbine engine, it will be appreciated that the present disclosure can apply to any component and need not be specific to a turbine engine or aircraft.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one element or feature from another and are not intended to signify location or importance of the individual elements or features.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something.

The term "fluid" may be a gas or a liquid, or multi-phase.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, higher, lower, front, back, top, bottom, above, upstream, downstream, forward, aft, etc.) as may be used herein are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that those two elements are directly connected and in fixed relation to one another. The exemplary drawings are for purposes of illustration only and the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

The term "composite," as used herein is, is indicative of a component having two or more materials. A composite can be a combination of at least two or more metallic, non-metallic, or a combination of metallic and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Additionally, as used herein, elements being "electrically connected," "electrically coupled," "communicatively coupled" or "in electrical communication," as well as terminology similar thereto, can include an electric, wired or wireless, transmission or signal being sent, received, or communicated to or from such connected or coupled elements. Furthermore, such electrical connections or couplings can include a wired or wireless connection, or a combination thereof.

One or more layers of adhesive can be used in forming or coupling composite components. Adhesives can include resin and phenolics, wherein the adhesive can require curing at elevated temperatures, elevated pressures, or by other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds, and other like components that would benefit from the lighter-weight and higher temperature capability these materials can offer.

The inventors' practice has proceeded in the foregoing manner of designing a system used in the manufacture of a component, such as an airfoil, designing the system to have improved tow fiber application, adhesion, and bond. This system is utilized during the design and creation of several different types of components, such as those utilized in the turbine engine shown in FIG. 1, as well as non-aircraft or non-turbine engine applications.

FIG. 1 is a schematic cross-sectional diagram of a turbine engine 10 for an aircraft. The turbine engine 10 has a generally longitudinally extending axis or engine centerline 12 extending from a forward 14 to an aft 16. The turbine engine 10 includes, in a downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the greater diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor 24, 26 can be mounted to (or integral to) a disk 61, which is mounted to the corresponding one of the HP and LP spools 48, 50. The static compressor vanes 60, 62 for a stage of the compressor 24, 26 can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine 34, 36 can be mounted to a disk 71, which is mounted to the corresponding one of the HP and LP spools 48, 50. The static turbine vanes 72, 74 for a stage of the compressor 24, 26 can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components for cooling. The temperature of pressurized airflow 76 entering the combustor 30 is significantly increased above the bleed air temperature. The bleed air 77 may be used to reduce the temperature of the core components downstream of the combustor 30.

A remaining portion of the pressurized airflow 76 bypasses the LP compressor 24 and engine core 44 as a bypass airflow 78 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
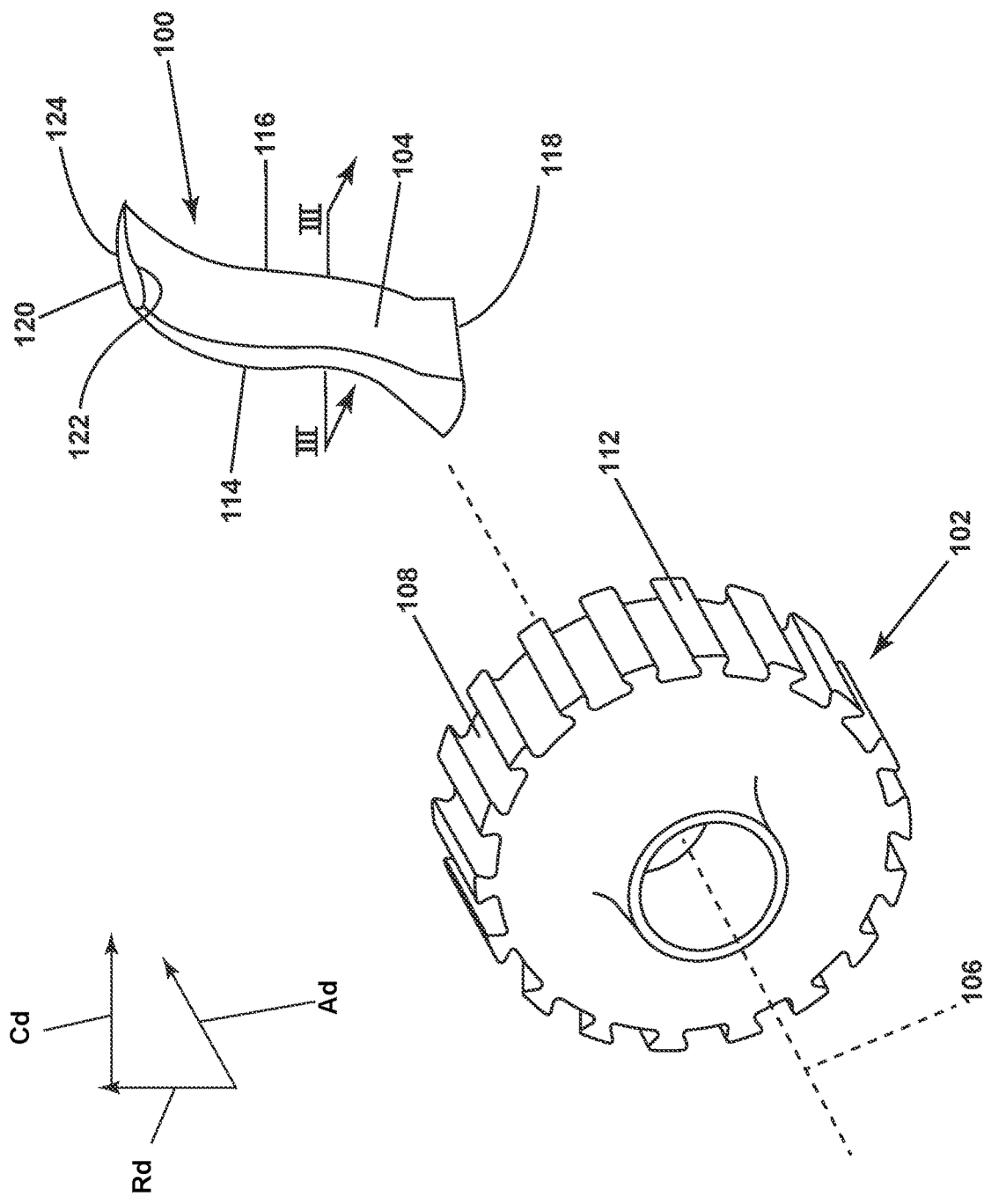
FIG. 2 is a schematic isometric view of a composite airfoil assembly and disk assembly suitable for use within the turbine engine of FIG. 1, in accordance with an exemplary aspect of the present disclosure.

FIG. 2 is a schematic isometric view of a composite airfoil 100 and a disk 102 suitable for use within the turbine engine 10 of FIG. 1. The composite airfoil 100 can define a body 104. The disk 102 is suitable for use as the disk 61, 71 (FIG. 1) or any other disk such as, but not limited to, a disk within the fan section 18 (FIG. 1), the compressor section 22 (FIG. 1), or the turbine section 32 (FIG. 1) of the turbine engine 10 (FIG. 1). The composite airfoil 100 can be rotating or non-rotating such that the composite airfoil 100 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil 100 can be a composite fan blade.

The composite airfoil 100, and the body 104 thereof, extends between a leading edge 114 and a trailing edge 116 to define a chord-wise direction, and extends between a root 118 and a tip 120 to define a span-wise direction. The composite airfoil 100 includes a pressure side 122 and a suction side 124.

The disk 102 can be rotatable or stationary about a rotational axis 106. The rotational axis 106 can coincide with, be parallel to, or be offset from the engine centerline 12 (FIG. 1). The disk 102 includes a plurality of slots 108 extending axially through a radially exterior surface 112 of the disk 102. The plurality of slots 108 are circumferentially spaced about the disk 102, with respect to the rotational axis 106, and permit the composite airfoil 100 to slidably secure to the disk 102.

The composite airfoil 100 couples to the disk 102 by inserting at least a portion of the composite airfoil 100 into a respective slot of the plurality of slots 108. The composite airfoil 100 is held in place by frictional contact with the slot 108 or can be coupled to the slot 108 via any suitable coupling method such as, but not limited to, welding, adhesion, fastening, or the like. While only a single composite airfoil 100 is illustrated, it will be appreciated that there can be any number of composite airfoils 100 coupled to the disk 102. As a non-limiting example, there can be a plurality of composite airfoil 100 corresponding to a total number of slots of the plurality of slots 108.

For the sake of reference, a set of relative reference directions, along with a coordinate system can be applied to the composite airfoil 100 and the disk 102. An axial direction (Ad) can extend from forward to aft and is shown extending at least partially into the page. The axial direction (Ad) and can be arranged parallel to the rotational axis 106, which can also be arranged parallel to the engine centerline 12 (FIG. 1). A radial direction (Rd) extends perpendicular to the axial direction (Ad), which can extend perpendicular to the engine centerline 12. A circumferential direction (Cd) can be defined perpendicular to the radial direction (Rd), which can be defined as a ray extending from a curvature or along a curvature of a circumference about the axial direction (Ad), can be defined as a ray extending locally from the radial direction (Rd), and/or can be defined along the circumference of the turbine engine 10 (FIG. 1) relative to the engine centerline 12 (FIG. 1) or rotational axis 106.

Figure 3:
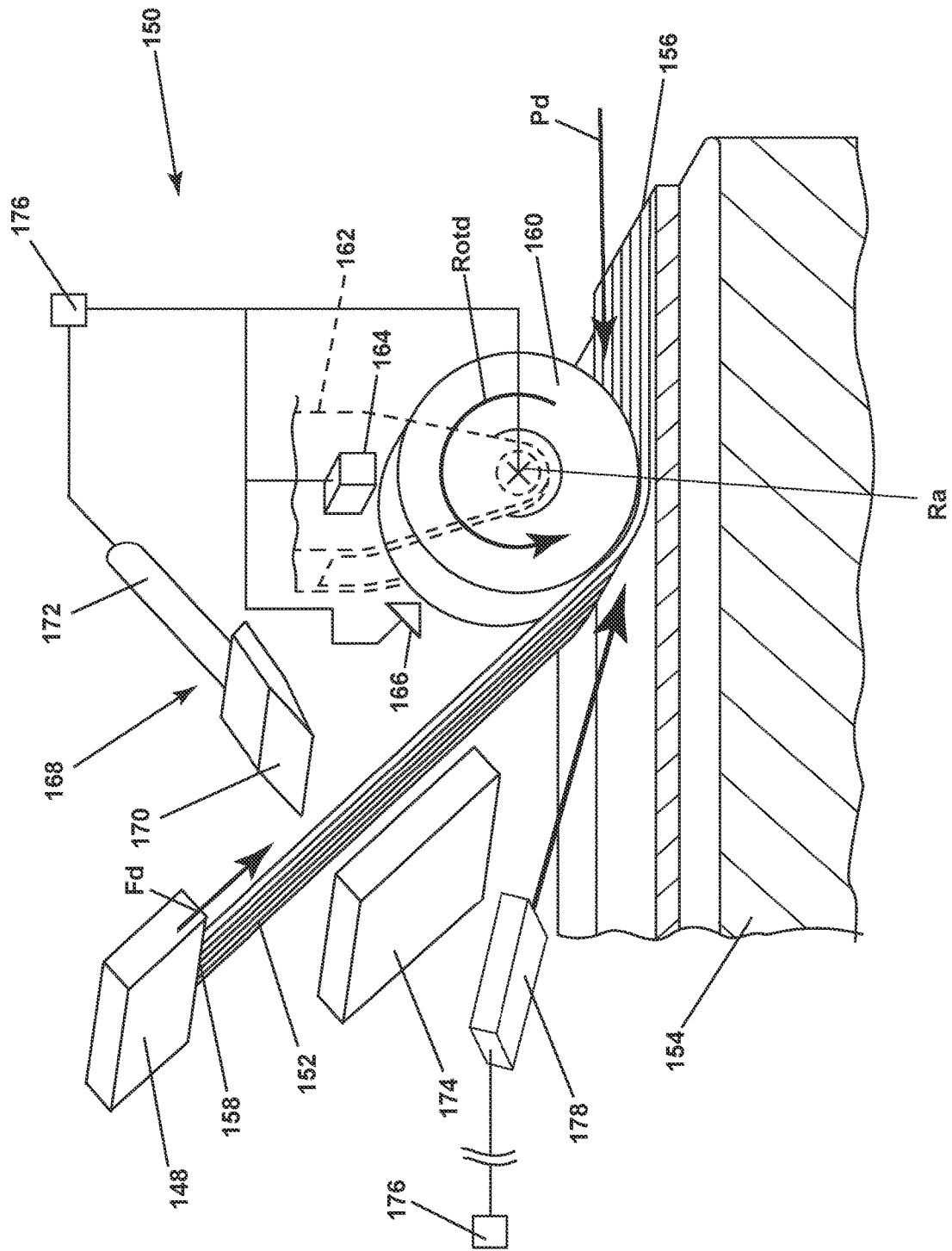
FIG. 3 is schematic isometric view of an automated fiber placement assembly with a pressure roller including a heater and a temperature sensor, in accordance with an exemplary aspect of the present disclosure.

FIG. 3 illustrates a schematic isometric view of an automated fiber placement assembly 150 that applies a strip of fiber tows 152 to a substrate 154. A fiber tow feeder 148 is provided for feeding the strip of fiber tows 152 for application to the substrate 154. The substrate 154 can be a mandrel or workpiece, in non-limiting examples, upon which a component is being formed. In another non-limiting examples, the substrate 154 can at least partially form the component, such as including previously placed layers of fiber tows, and can be at least partially completed or finished through the application of the strip of fiber tows 152 to the substrate 154. In one non-limiting example, the substrate 154 can be a component, such as the composite airfoil 100 of FIG. 2, while non-turbine or non-engine components are contemplated.

The strip of fiber tows 152 extends between a first end 156 and a second end 158 and is fed in a feed direction (Fd). A heated pressure roller 160, suspended by a mount 162 (shown in broken line), applies the strip of fiber tows 152 to the substrate 154 in a placement direction (Pd) while rotating in a rotating direction (Rotd) about a rotational axis (Ra) represented as an "X" as shown. During application, the heated pressure roller 160 applies a compaction pressure to the strip of fiber tows 152 against the substrate 154, as well as applying heat. In one non-limiting example, the heated pressure roller 160 can be covered by a non-stick coating, such as a polytetrafluoroethylene, while alternate adhesion resistant or low friction materials are contemplated. Multiple layers or stacks of strips of fiber tows 152 can be applied in this manner in order to form the substrate 154.

A pressure roller heater 164 can be positioned adjacent the heated pressure roller 160 and can apply heat to the heated pressure roller 160. In one example, the mount 162 can be used to position the pressure roller heater 164 adjacent the heated pressure roller 160, while any mounting system is contemplated. A temperature sensor 166 can be positioned adjacent to and behind the pressure roller heater 164 relative to the rotating direction (Rotd). Such a position of the temperature sensor 166 permits temperature measurement of the heated pressure roller 160 after being heated by the pressure roller heater 164. Such a measurement can be made prior to contact against the strip of fiber tows 152, to ensure that the heated pressure roller 160 is heated to an intended temperature prior to beginning application of the strip of fiber tows 152. In alternative non-limiting examples, any suitable placement of the temperature sensor 166, relative to the heated pressure roller 160, is contemplated. A cutter assembly 168 includes a cutter head 170 coupled to an actuator 172 that actuates the cutter head 170 to cut the strip of fiber tows 152 against a backplate 174. Exemplary actuators 172 can include a driver, such as a motor or cylinder which reciprocates to cut the strip of fiber tows 152 with the cutter head 170.

A controller 176 is operatively and communicatively coupled to the heated pressure roller 160, the pressure roller heater 164, the temperature sensor 166, the cutter assembly 168, or any other portion of the automated fiber placement assembly 150, or a combination thereof. The controller 176 can control cutting of the strip of fiber tows 152 via the cutter assembly 168 by actuation of the cutter head 170 with the actuator 172. The controller 176 can control the speed or the rate of passage of the strip of fiber tows 152 with the heated pressure roller 160, such as control of a motor rotating the heated pressure roller 160, as well as the temperature or amount of heat applied to the heated pressure roller 160 by the pressure roller heater 164, and therefore, can control a temperature of the heated pressure roller 160. The temperature sensor 166 can provide a signal to the controller 176 indicative of the temperature of the heated pressure roller 160 after application of heat by the pressure roller heater 164. If temperatures are outside of expected ranges or thresholds, the temperature of the heated pressure roller 160 can be varied by the controller 176 by changing the temperature or amount of heat emitted the pressure roller heater 164, which can be verified by feedback from the temperature sensor 166.

A heat source 178 can be provided to heat the substrate 154 or the surface of the strip of fiber tows 152 that does not contact the heated pressure roller 160. The heat source 178 provides additional heat in order to pre-cure, activate, or otherwise facilitate adhesion or application of the strip of fiber tows 152 to the substrate 154, in addition to the heat applied by the heated pressure roller 160. For example, resins provided within the strip of fiber tows 152 can be activated by the addition of heat. The heat source 178 can be operably or communicatively coupled to the controller 176 in order for the controller 176 to control application of heat or the temperature of the applied heat.

In operation, heat is applied by the pressure roller heater 164 to the heated pressure roller 160, heating the heated pressure roller 160 to a desired temperature, with a minimum or a maximum temperature, or within a desired temperature range. The temperature sensor 166 can measure the temperature of the heated pressure roller 160 to ensure an intended temperature is reached or within an acceptable range. The heated pressure roller 160 can be rotated about the rotational axis (Ra) during application of heat by the pressure roller heater 164 to provide even heat distribution across the heated pressure roller 160 prior to the introduction of the strip of fiber tows 152. Such an application of heat prior to introduction of the strip of fiber tows 152 can provide for even application of heat from the heated pressure roller 160 to the strip of fiber tows 152 beginning at the first end 156. After any initial heating of the heated pressure roller 160, additional or continuous heat can be applied to the heated pressure roller 160 by the pressure roller heater 164 to ensure consistent application of heat along the full length of the strip of fiber tows 152. Measurements by the temperature sensor 166 during application can be used to ensure consistent temperatures, and measurements outside of expected or desired temperatures can be amended through control of the pressure roller heater 164 and with feedback provided by the temperature sensor 166.

In an alternative, non-limiting example, application of the heat provided from either or both of the pressure roller heater 164 and the heat source 178 may be switched on or off as desired via the controller 176. Direct control of application of the heat can provide for heating particular or discrete portions of the strip of fiber tows 152 by controlled application of heat to the heated pressure roller 160, such as by providing heat by only one of the pressure roller heater 164 or the heat source 178, or by discretely applying heat to different portions of the heated pressure roller 160 or the strips of fiber tows 152. Additionally, such control can provide for varying the bond achieved along different areas or portions of the substrate 154 by varying the amount of heat applied at the different areas or portions of the substrate 154, which can be applied by one or both of the pressure roller heater 164 or the heat source 178.

Utilizing the pressure roller heater 164 to heat the heated pressure roller 160 permits direct control of the applied heat at the heated pressure roller 160, as well as provision of simultaneous pressure applied by the heated pressure roller 160 against the strip of fiber tows 152. In this way, the heated pressure roller 160 permits an improved bond among the substrate 154 and the strip of fiber tows 152, which may not be otherwise achieved by application of separate heat and pressure. Additionally, utilizing the dedicated pressure roller heater 164 with the temperature sensor 166 permits the consistent application of heat along the full surface of the heated pressure roller 160 as the strip of fiber tows 152 is applied. Such consistent heat application reduces or eliminates the opportunity for poor adhesion or bond during application of the strip of fiber tows 152, which may otherwise occur because of inconsistent or varying temperatures or pressures.

Figure 4:
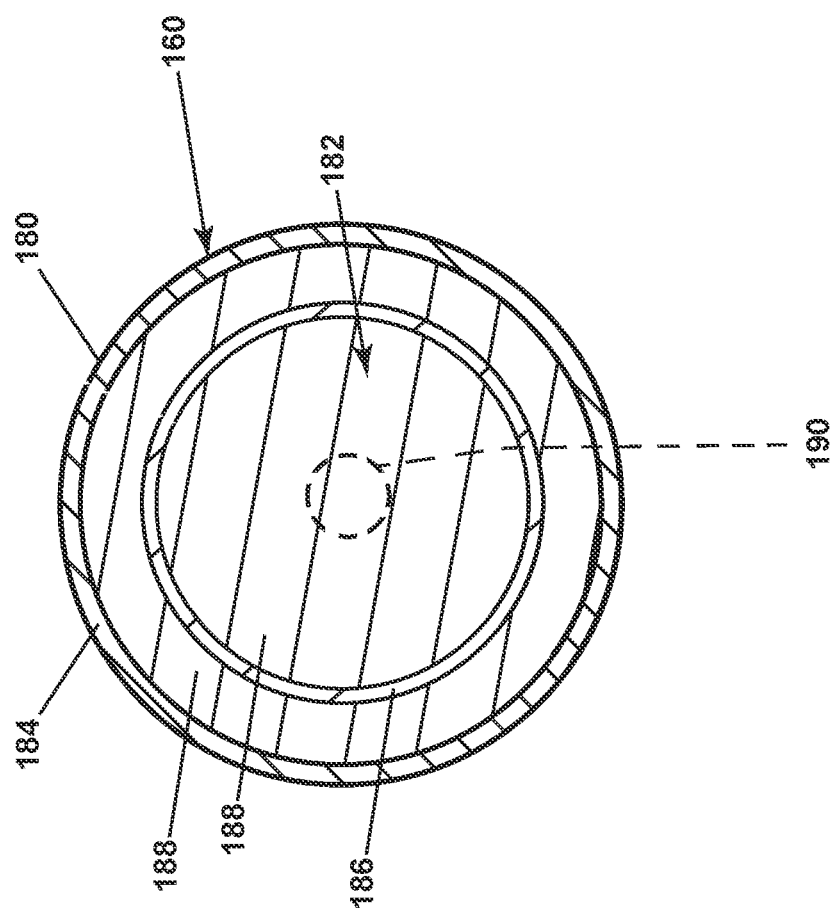
FIG. 4 is a cross-sectional view of the pressure roller of FIG. 3 including a core, in accordance with an exemplary aspect of the present disclosure.

FIG. 4 shows a section view of the heated pressure roller 160, including an outer wall 180 defining an interior 182. An adhesion resistant coating 184, such as a polytetrafluoroethylene coating, is provided on or at least partially forms the outer wall 180 and reduces adhesion of the heated pressure roller 160 to the strip of fiber tows 152 (FIG. 3). A core 186 is provided within the interior 182. The core 186 can be formed of materials such as ceramics can provide thermal stability or reduce local temperature variations within the interior 182. In non-limiting examples, the core 186 can include metallic, ceramic, or metal composites, or combinations thereof. A pliable material 188 can be provided within the interior 182 between the core 186 and the outer wall 180. In a non-limiting example, the outer wall 180 can partially or fully form the outer wall 180. The pliable material 188 can increase thermal stability across the heated pressure roller 160, or across a strip of fiber tows along the heated pressure roller 160, without creating local hot areas due to increases in local pressure. The pliable material 188 is pliable to conform to a non-uniform shape defined by a strip of fiber tows or defined by an underlying substrate, where local temperature variations may otherwise result along non-flat shapes or geometries. In a non-limiting example, the pliable material 188 can be a urethane foam, or other rubber, compliant, or polymer materials. In a non-limiting example, the interior 182 can be filled with the pliable material 188 to a particular pressure in order to define a particular compaction pressure within the heated pressure roller 160. Such a compaction pressure can affect the bond among the strip of fiber tows 152 (FIG. 3) and the substrate 154 (FIG. 3), particularly with the complement of added heat by the pressure roller heater 164, such as by increasing the bond among the substrate 154 and the strip of fiber tows 152.

The interior 182 within the core 186 can be filled with the pliable material 188. In alternative, non-limiting examples, the core 186 can be hollow or filled with a material different than that of the pliable material 188. The interior 182 within the core 186 can also defined a compaction pressure within the core 186 that can be the same as that of the interior 182 between the core 186 and the outer wall 180, while alternative pressures are contemplated.

In an alternative, non-limiting example, the heated pressure roller 160 can incorporate internal heating elements 190 that internally heat the core 186, and therefore, the heated pressure roller 160. The internal heating elements 190 can define the pressure roller heater 164 or can be utilized with an external pressure roller heater 164 as shown in FIG. 3, and it is contemplated that the internal heating elements 190 can be utilized in place of or in addition to the external pressure roller heater 164 (FIG. 3), for example. Such heating elements can include slip ring contacts coupling the internal heating elements 190 to the core 186 in order to provide electrical power to the internal heating elements 190. Another non-limiting example of an alternative core can include an induction heated roller, with a magnetic core (e.g., core 186 can include magnetic materials). Such a core 186 with magnetic materials can be continuous or segmented, having a set of multiple discrete segments, such as in annular arrangement, forming the core 186, and the internal heating elements 190 can induce an electrical current in the core 186. In yet another non-limiting example, the core 186 can be heated via infrared heating (e.g., the pressure roller heater 164 can include an infrared heater).

Figure 5:
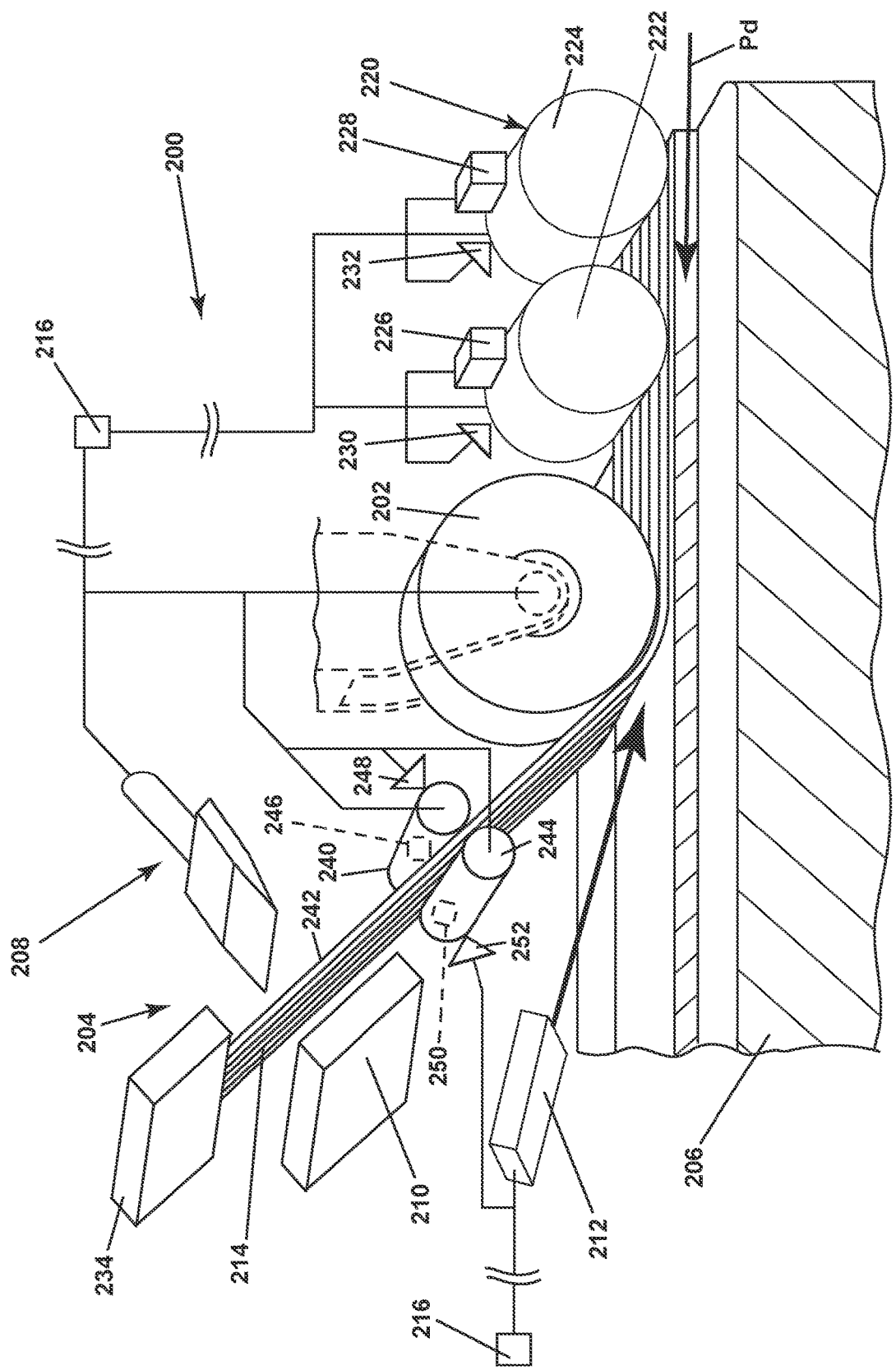
FIG. 5 is schematic isometric view of an alternate automated fiber placement assembly with two heated rollers arranged behind a pressure roller, and a heated roller with a backpressure roller positioned forward of the pressure roller, in accordance with an exemplary aspect of the present disclosure.

FIG. 5 is a schematic sectional view of another exemplary automated fiber placement assembly 200 including a pressure roller 202 applying a strip of fiber tows 204 from a fiber tow feeder 234 to a substrate 206. The pressure roller 202 applies a compaction pressure to the strip of fiber tows 204 against the substrate 206. A cutter assembly 208 cuts the strip of fiber tows 204 against a backplate 210. A heat source 212 can apply heat to a bottom surface 214 of the strip of fiber tows 204, or to the substrate 206 where the strip of fiber tows 204 is to be laid, or a combination thereof. A controller 216 can be operably and communicatively coupled to one or more of the pressure roller 202, the cutter assembly 208, or the heat source 212 to permit controlled operation of the automated fiber placement assembly 200. While the pressure roller 202 is shown without a heater, it is contemplated that the pressure roller 202 can be a heated pressure roller, similar to that of the heated pressure roller 160 of FIG. 3, being heated by a dedicated heater, such as the pressure roller heater 164 (FIG. 3).

A set of heated pressure rollers 220 includes a first heated pressure roller 222 and a second heated pressure roller 224 in serial arrangement along the strip of fiber tows 2004. Each of the first and second heated pressure roller 222, 224 has a dedicated heater as a first pressure roller heater 226 and a second pressure roller heater 228, and each with a dedicated temperature sensor as a first temperature sensor 230 and a second temperature sensor 232. The set of heated pressure rollers 220 are positioned behind the pressure roller 202, relative to the placement direction (Pd). While the set of heated pressure rollers 220 is shown as two heated pressure rollers, any number of heated pressure rollers is contemplated, including one or more, or a set of multiple heated pressure rollers including at least two heated pressure rollers. Each heated roller of the set of heated pressure rollers 220 can include a dedicated heater and temperature sensor, while an arrangement where a single heater heats more than one heated roller, or an arrangement with less temperature sensors than a one-to-one ratio with the heated rollers is contemplated. The first and second heated pressure rollers 222, 224 apply both heat and a compaction pressure to the strip of fiber tows 204 against the substrate 206.

A first preheat roller 240 is arranged against a top surface 242 of the strip of fiber tows 204 and positioned on the same side of the strip of fiber tows 204 compared to that of the pressure roller 202 and the set of heated pressure rollers 220. In a non-limiting example, the first preheat roller 240 can be heated, such as by including a first preheat roller heater 246, which can be internal, while an external heater is contemplated. A second preheat roller 244 is positioned against the bottom surface 214 of the strip of fiber tows 204 and can be similarly heated by a second preheat roller heater 250. The second preheat roller 244 can be arranged adjacent the first preheat roller 240. It is contemplated that the first and second preheat rollers 240, 244 can provide pressure to the strip of fiber tows 204 by sandwiching the strip of fiber tows 204 between the first preheat roller 240 and the second preheat roller 244. That is, the first and second preheat rollers 240, 244 can apply both heat and pressure to the strip of fiber tows 204. A third temperature sensor 248 can measure the temperature of the first preheat roller 240 to ensure proper temperature, and a fourth temperature sensor 252 can measure the temperature of the second preheat roller 244. The first and second preheat rollers 240, 244 can be communicatively and operatively coupled to the controller 216, permitting control of the temperature of the first and second preheat rollers 240, 244, the first and second preheat roller heaters 246, 250, the third and fourth temperature sensors 248, 252, or any additional heaters or temperatures sensors arranged with the first and second preheat rollers 240, 244. In a non-limiting example, only one of the first and second preheat rollers 240, 244 can be heated. In another non-limiting example, the pressure applied by the first and second preheat rollers 240, 244 can be controlled by the initial positioning of the first and second preheat rollers 240, 244, as a function of thickness of the strip of fiber tows 204, while variable control of a pressure applied between the first and second preheat rollers 240, 244 by way of the controller 216 is contemplated.

In operation, the pressure roller 202 applies the strip of fiber tows 204 to the substrate 206 under a predetermined pressure while the cutter assembly 208 can cut the strip of fiber tows 204. The first and second preheat rollers 240, 244 can apply heat to the strip of fiber tows 204 prior to application to the substrate 206 by the pressure roller 202, and can apply pressure to the strip of fiber tows 204 between the first and second preheat rollers 240, 244. The first and second preheat rollers 240, 244 can provide a combination of heat and pressure to the strip of fiber tows 204 prior to application at the pressure roller 202, in order to at least partially activate or otherwise prepare the strip of fiber tows 204 for application to the substrate 206. Such heat and pressure applied to the strip of fiber tows 204 prior to the pressure roller 202 provide improved adhesion and bond among the strip of fiber tows 204 and the substrate 206. Additionally, preheating the strip of fiber tows 204 with the first and second preheat rollers 240, 244 prior to application at the pressure roller 202 can reduce overall contact time between the strip of fiber tows 204 and the pressure roller 202, such as by speeding up rotation of the pressure roller 202, which can reduce sticking at the pressure roller 202 as well as reduce overall application time via the reduction of contact time at the pressure roller 202. Such reduction in application time or contact time can further improve bond or adhesion by creating lesser opportunity for adhesion at the pressure roller 202.

After application of the strip of fiber tows 204 at the pressure roller 202, with or without applying heat or pressure at the first and second preheat rollers 240, 244, the first heated pressure roller 222 can heat the applied strip of fiber tows 204, as well as apply additional pressure by squeezing the strip of fiber tows 204 against the substrate 206. The first heated pressure roller 222 is heated, such as by the first pressure roller heater 226, to a desired temperature, which can be measured and confirmed by the first temperature sensor 230, and applies further heat and pressure to the strip of fiber tows 204 after application to the substrate 206 by the pressure roller 202. Similarly, the second heated pressure roller 224, heated by the second pressure roller heater 228, applies additional heat and pressure to the strip of fiber tows 204 after the first heated pressure roller 222. In a non-limiting example, the successive first and second heated pressure rollers 222, 224 can be heated to different temperatures to define a temperature gradient across the first and second heated pressure rollers 222, 224. The temperature gradient is applied to the strip of fiber tows 204 through the first and second heated pressure rollers 222, 224. For example, the first heated pressure roller 222 can be at a relatively higher temperature, and the second heated pressure roller 224 can be at a relatively lower temperature, defining a decreasing temperature gradient extending farther from the pressure roller 202. The associated first and second temperature sensors 230, 232 can provide thermal feedback indicating temperatures along the first and second heated pressure rollers 222, 224 to control the particular temperature gradient along the set of heated pressure rollers 220.

Utilizing the temperature gradient can define a temperature profile along the strip of fiber tows 204 heated by the first and second heated pressure rollers 222, 224. The temperature profile can be tailored to increase adhesion and bond between the strip of fiber tows 204 and the substrate 206, thereby improving overall adhesion and bond for the formed component. Additionally, finishing of the component, such as heat or pressure finishing, can be reduced, reducing overall production time and cost.

Figure 6:
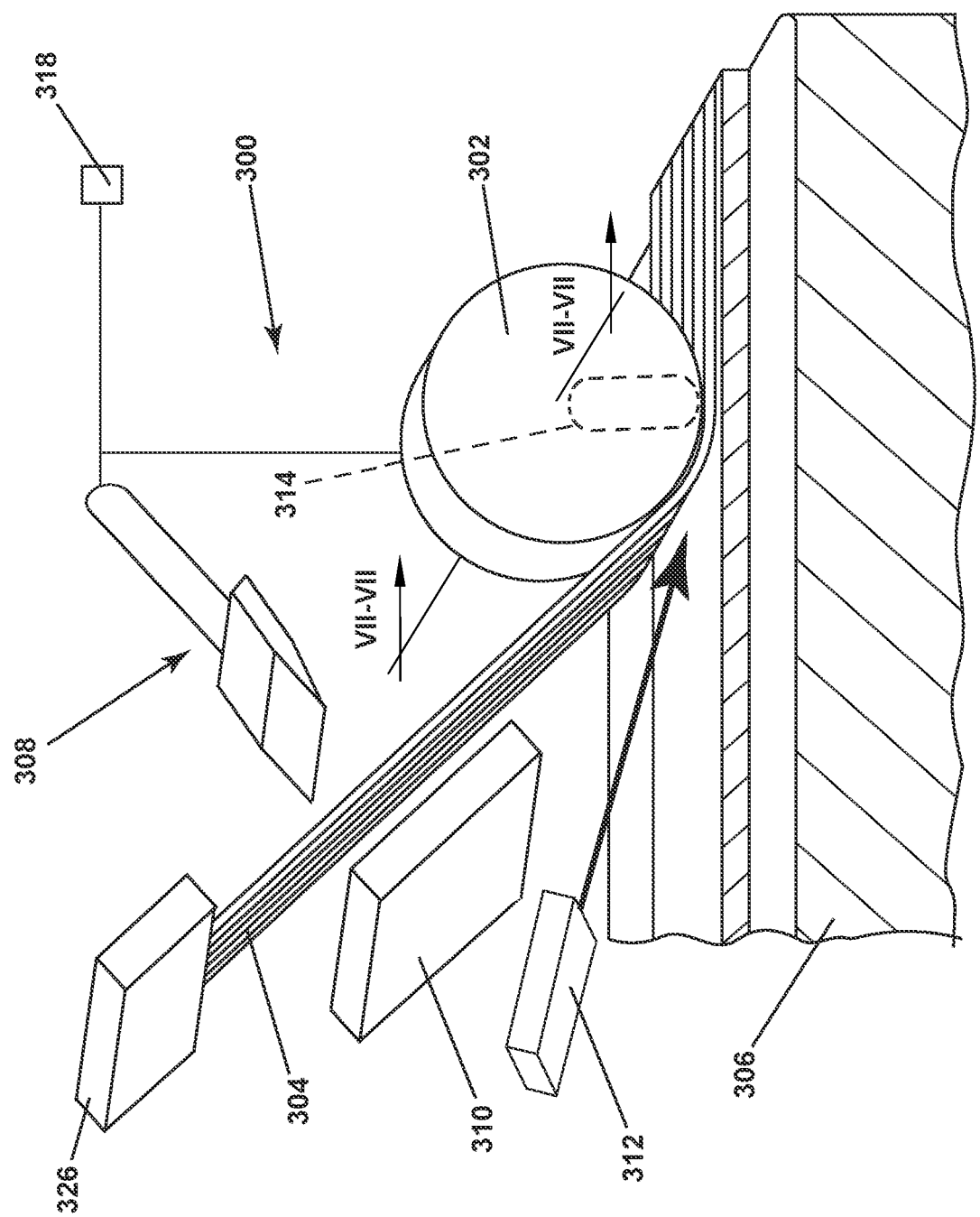
FIG. 6 is schematic isometric view of another automated fiber placement assembly with a pressure roller having a heater positioned interior of the pressure roller, in accordance with an exemplary aspect of the present disclosure.

FIG. 6 is a schematic, sectional view of another exemplary automated fiber placement assembly 300 including a heated pressure roller 302 applying a strip of fiber tows 304 to a substrate 306 from a fiber tow feeder 326. The heated pressure roller 302 applies a compaction pressure to the strip of fiber tows 304 against the substrate 306. The heated pressure roller 302 can be a heated by a pressure roller heater 314, provided interior of the heated pressure roller 302. A cutter assembly 308 cuts the strip of fiber tows 304 against a backplate 310. A heat source 312 can apply heat to the strip of fiber tows 304, to the substrate 306 prior to the strip of fiber tows 304 being laid, or a combination thereof. A controller 318 can be communicatively and operatively coupled to the heated pressure roller 302, as well as any other portion of the automated fiber placement assembly 300 to permit control and operation thereof by a user.

Figure 7:
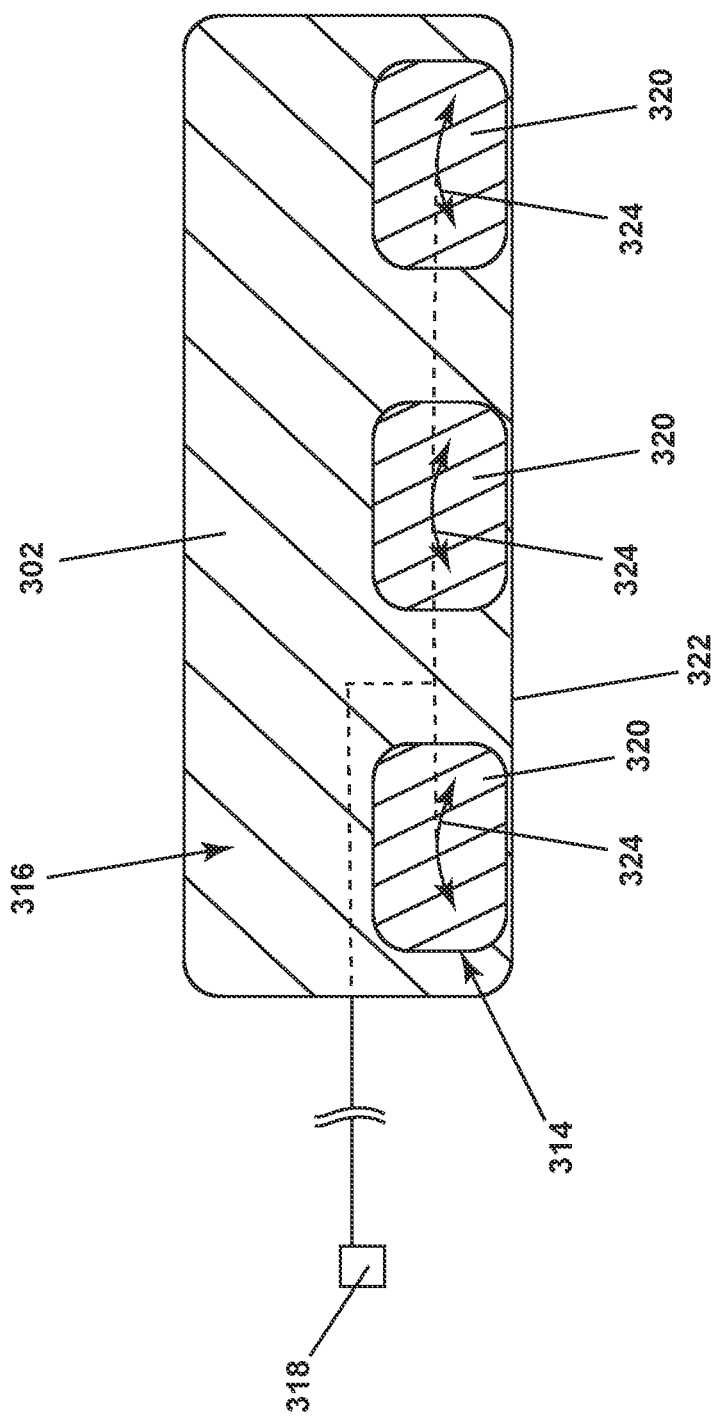
FIG. 7 is a sectional view of the pressure roller of FIG. 6 taken across section VII-VII, showing a set of pivotable heaters within the interior of the pressure roller, in accordance with an exemplary aspect of the present disclosure.

FIG. 7 shows a section view of the heated pressure roller 302 of FIG. 6 taken along section VII-VII, showing the pressure roller heater 314 positioned with an interior 316 of the heated pressure roller 302 and arranged as three independent interior heaters 320, while any suitable number of heaters is contemplated. Each interior heater 320 can be mounted or otherwise positioned in the heated pressure roller 302 adjacent to a contact surface 322. The contact surface 322 can be defined as a portion of the heated pressure roller 302 that is in contact with the strip of fiber tows 304 (FIG. 6) as they are being laid. More specifically, the contact surface 322 can change along the heated pressure roller 302 as the heated pressure roller 302 rotates during application of the strip of fiber tows 304 (FIG. 6). In one non-limiting example, the interior 316 can be filled with a fluid material, such as a liquid or gas, to permit rotation of the heated pressure roller 302 while maintaining the position of the interior heaters 320 at the contact surface 322.

Each interior heater 320 can be pivotably mounted within the interior 316, permitting pivoting of each interior heater 320 relative to the contact surface 322 in a pivoting direction 324. While the interior heaters 320 are shown in a spaced arrangement, it is contemplated that the interior heaters 320 are positioned adjacent to one another so that no spacing exists, or that such spacing is reduced as possible while permitting pivoting movement of the interior heaters 320. A staggered arrangement can provide for covering the full width of the strip of fiber tows 304 (FIG. 6), while permitting room for pivoting movement.

In operation, heat can be applied to the heated pressure roller 302 by the interior heaters 320. When the contact surface 322 contacts the strip of fiber tows 304 along a non-flat or non-planar surface, the heated pressure roller 302 or material within the interior 316 can deform complementary to the contact surface 322, such that the interior heaters 320 are permitted to pivot in the pivoting direction 324 in order to better conform to the shape of the substrate 306 (FIG. 6), while applying heat consistently across the interior heaters 320, or even discretely among some interior heaters 320 in order to apply heat to only a portion of the strip of fiber tows 304.

The ability of the interior heaters 320 to pivot in the pivoting direction 324 provides for greater consistency of heat application among substrates 306 that have complex shapes, such as non-flat shapes. Additionally, individual interior heaters 320 permit heating only a portion of the strip of fiber tows 304 or heating different portions of the strip of fiber tows 304 differently, or both, such that local bond or adhesion can be tailored to local applications of heat, as well as local materials or intended features of the finished component, such as elasticity, hardness, or other inherent features.

Figure 8:
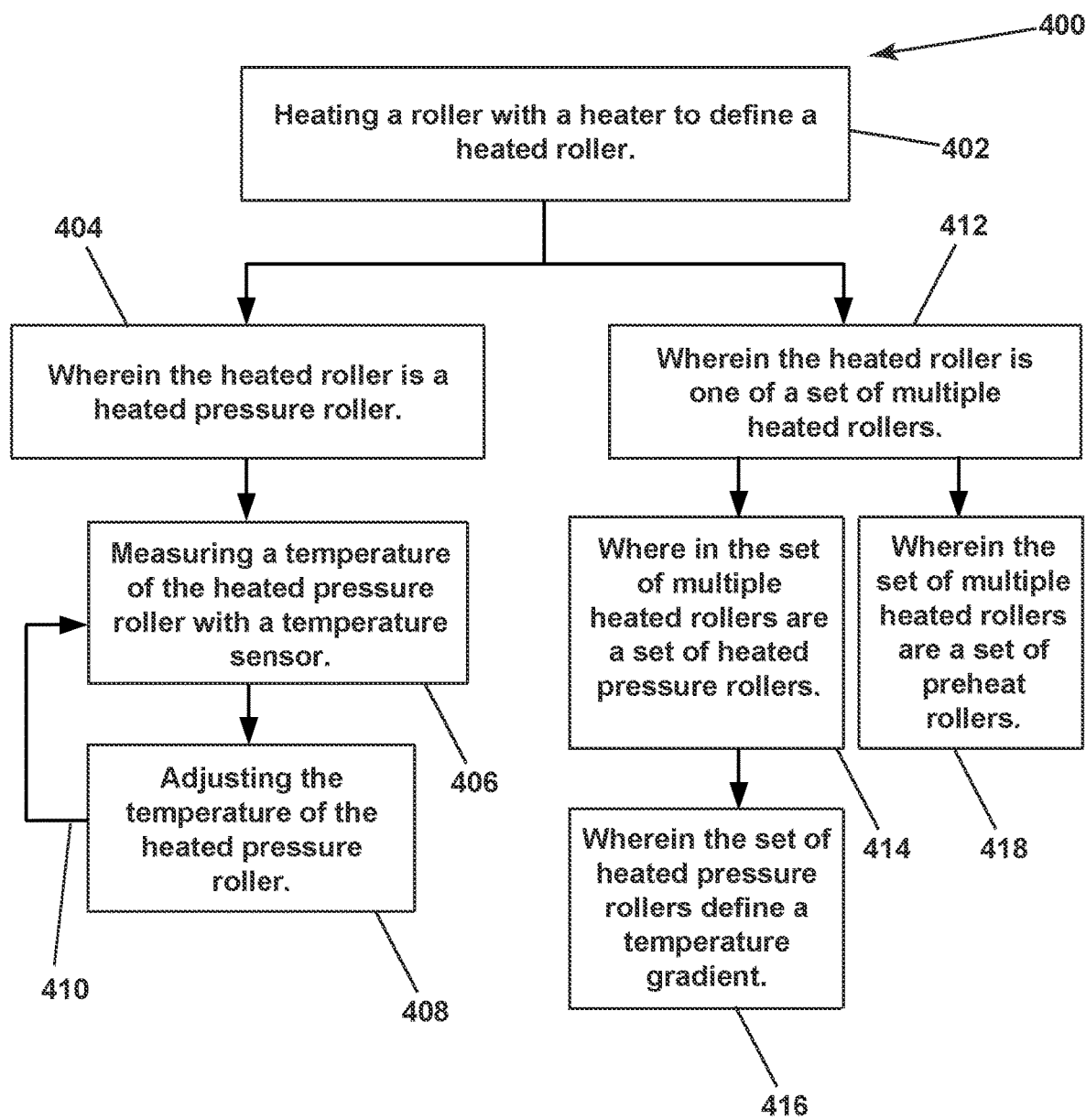
FIG. 8 illustrates a flow chart depicting a method of forming a component with an automated fiber placement assembly, in accordance with an exemplary aspect of the present disclosure.

FIG. 8 depicts a flow chart showing a method 400 of forming a component on a substrate, such as the substrate 154, 206, 306 of FIGS. 3, 5, and 6 described herein, by the application of successive layers of strips of fiber tows, such as the strips of fiber tows 152, 204, 304 (FIGS. 3, 5, and 6). An automated fiber placement assembly, such as the automated fiber placement assembly 150, 200, 300 (FIGS. 3, 5, and 6), successively layers the strip of fiber tows 152, 204, 304 to build the component upon the substrate 154, 206, 306.

At 402, the method 400 can include heating a roller with a heater to define a heated roller. The roller can be the heated pressure roller 160, 302 (FIGS. 3 and 6), the first and second heated pressure rollers 222, 224 (FIG. 5), and the first and second preheat rollers 240, 244 (FIG. 5) as described herein. The heater can be the pressure roller heater 164, 226, 228 (FIGS. 3 and 5), the internal heating element 190 (FIG. 4), the first and second preheat roller heaters 246, 250 (FIG. 5), or the pressure roller heater 314 or the interior heaters 320 (FIGS. 6-7) as described herein. Heating of the rollers can be done prior to application of the strip of fiber tows 152, 204, 304 such as heating the rollers to a predetermined temperature before applying the strip of fiber tows 152, 204, 304, in a non-limiting example. In additional non-limiting examples, heating the roller can include heating a roller externally, interior, or both exterior and interior.

At 404, the method 400 can include wherein the heated roller is a heated pressure roller, such as the heated pressure roller 160, 222, 224, 302 (FIGS. 3, 5, and 6). The heated pressure roller 160, 222, 224, 302 can be heated by the pressure roller heater 164, 226, 228, 314 and provides an application pressure against the strip of fiber tows 152, 204, 304 between the heated pressure roller 160, 222, 224, 302 and the substrate 154, 206, 306. For example, in FIG. 3, the pressure roller heater 164 applies heat to the heated pressure roller 160 to define the heated pressure roller, which then applies both heat and pressure to the strip of fiber tows 152 against the substrate 154. In FIG. 4, the heated pressure roller 160 can be heated by an internal heating element 190. In FIG. 5, the heated pressure roller 160 can be the first or second heated pressure roller 222, 224, or both, being heated by the first and second pressure roller heaters 226, 228, respectively. In FIGS. 6-7, internal pressure roller heaters 314 heat the heated pressure roller 302 from the interior 316.

At 406, the method 400 can include measuring a temperature of the heated pressure roller 160, 222, 224 with a temperature sensor, such as the temperature sensor 166, 230, 232 of FIGS. 3 and 5. The temperature sensor 166, 230, 232 can measure the temperature of the heated pressure roller 160, 222, 224 to determine if the temperature meets an intended temperature, a minimum or maximum temperature, or is within a temperature range. Such a measurement can be initiated or directed by a user or by a controller, such as the controller 176, 216 (FIGS. 3 and 5). The temperature sensor 166, 230, 232 can perform a temperature measurement of the heated pressure roller 160, 222, 224 and provide a signal to the controller 176, 216, 318 representative of the temperature of the heated pressure roller 160, 222, 224. The controller 176, 216 can utilize the signal to determine the temperature of the heated pressure roller 160, 222, 224 to determine if the temperature meets the intended temperature, the minimum or maximum temperature, or is within the temperature range.

At 408, if the measured temperature is not the intended temperature, or is outside of the minimum, maximum, or temperature range, the method 400 can include adjusting the temperature of the heated pressure roller 160, 222, 224. For example, the controller 176, 216, or a user operating the controller 176, 216, can operate the pressure roller heater 164, 226, 228 to increase or decrease heat output to vary the temperature of the heated pressure roller 160, 222, 224 in order to meet the intended temperature, a minimum or maximum temperature, or temperature range.

At 410, the method 400 can include repeating measuring of the heated pressure roller 160, 222, 224 with the temperature sensor 166, 230, 232, at 406, and adjusting the temperature of the heated pressure roller 160, 222, 224, at 408. During operation of the automated fiber placement assembly 150, 200, 300, environmental conditions or varying temperatures among the substrate 154, 206, the strips of fiber tows 152, 204, or other aspects of the system can result in changes in the temperature of the heated pressure rollers 160, 222, 224 over time. Therefore, it is beneficial to monitor the temperature of the heated pressure rollers 160, 222, 224 with the temperature sensor 166, 230, 232 and increase or decrease the heat output of the heater to ensure that the temperature of the heated pressure roller 160, 222, 224 remains at the intended temperature, above a minimum temperature, below a maximum temperature, or within a temperature range, or combinations thereof.

At 412, the method 400 can include wherein the heated roller is one of a set of multiple heated rollers. For example, the set of heated rollers can be the first and second heated pressure rollers 222, 224, or can be the first and second preheat rollers 240, 244, or both. Where the set of heated rollers are the first and second heated pressure rollers 222, 224, the set of heated rollers can have a serial arrangement, contacting the strip of fiber tows at different positions along the length of the strip of fiber tows. Where the set of heated rollers are the first and second preheat rollers 240, 244, the set of heated rollers can contact the strip of fiber tows at the same position, on opposite sides of the strip of fiber tows, while different positions are contemplated. In additional non-limiting examples, the set of multiple heated rollers can be arranged at different positions along the length of the strip of fiber tows, as well as on opposite sides of the strip of fiber tows 204.

At 414, the method 400 can include wherein the set of multiple heated rollers are a set of multiple heated pressure rollers, like the set of heated pressure rollers 220 of FIG. 5, which can be the first and second heated pressure rollers 222, 224. The first and second heated pressure rollers 222, 224 are heated by the first and second pressure roller heaters 226, 228, and apply both heat and pressure to the strip of fiber tows 204 against the substrate 206. It is contemplated that the temperatures among the set heated pressure rollers 220 can be the same, different, or both where the number of heated pressure rollers permits such an arrangement. At 416, the method can include applying a temperature gradient to the strip of fiber tows 204 with the set of heated pressure rollers 220. More specifically, the first and second heated pressure rollers 222, 224 among the set of heated pressure rollers 220 can have defined temperatures that change or vary in a predetermined manner, such as having a constant or non-constant rate of change in temperature, in non-limiting examples.

At 418, the method can include wherein the set of multiple heated rollers are a set of preheat rollers, such as the first and second preheat rollers 240, 244 of FIG. 5. A set of preheat rollers can include only one preheat roller, while two or more preheat rollers are contemplated. The first and second preheat rollers 240, 244 can be heated rollers that contact and heat the strip of fiber tows 204 before the strip of fiber tows 204 contacts the substrate 206. In a non-limiting example, the first and second preheat rollers 240, 244 can be arranged on opposite sides of the strip of fiber tows 204, as arranged in FIG. 5. In additional non-limiting examples, any number of preheat rollers 240, 244 arranged at any position along the length of the strip of fiber tows 204, on any side of the strip of fiber tows 204, is contemplated.

It should be appreciated that the method 400, or portions thereof, can be repeated for multiple layers of strips of fiber tows 152, 204, 304, such that the component is built through successive layering of the strips of fiber tows 152, 204, 304 which can be accomplished by repeating the method 400 or portions thereof. In a non-limiting example, the method 400 at 404-410 can be repeated to build a component with a heated pressure roller 160, 222, 224, 302, while maintaining appropriate temperatures for the heated pressure roller. In another non-limiting example, the method 400 at 412-416 can be repeated to build a component with a set of heated pressure rollers 220, which can be positioned behind a pressure roller 202. In another non-limiting example, the method 400 at 412 and 418 can be repeated to build a component utilizing the preheat rollers 240, 244. In further non-limiting examples, it should be appreciated that portions or aspects of the method 400 can be added, removed, mixed, interchanged, or otherwise rearranged in order to define a new method, which include applying heat at an automated fiber placement assembly.

The aspects described herein provide a process or method 400 of forming a component upon a substrate 154, 206, 306, such as the composite airfoil 100, or a portion thereof. Heating of the automated fiber placement assembly, or aspects thereof, can increase or improve adhesion and bond between laid strips of fiber tows and the underlying substrate. Improved adhesion and bond can increase integrity of the formed component, as well as accuracy of the formed component, increasing total component lifetime while reducing maintenance and cost.

The benefits associated with utilizing a heated roller for an automated fiber placement assembly, or a method, as described herein, provide for improved adhesion and bond among the laid strip of fiber tows and the underlying component. Improved adhesion and bond can increase component lifetime and reduce related maintenance.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An automated fiber placement assembly for forming a component on a substrate, the automated fiber placement assembly comprising: a strip of fiber tows; a pressure roller for applying the strip of fiber tows to the substrate in a placement direction; and a roller heater positioned to heat the pressure roller.

The automated fiber placement assembly of any preceding clause further comprising a temperature sensor positioned adjacent the pressure roller.

The automated fiber placement assembly of any preceding clause wherein the pressure roller rotates in a rotating direction, and wherein the temperature sensor is positioned downstream of the roller heater relative to the rotating direction.

The automated fiber placement assembly of any preceding clause wherein the temperature sensor is positioned behind where the strip of fiber tows contacts the substrate, relative to the rotating direction.

The automated fiber placement assembly of any preceding clause wherein the pressure roller is filled with a fluid material.

The automated fiber placement assembly of any preceding clause wherein the pressure roller includes an outer wall with an adhesion resistant coating.

The automated fiber placement assembly of claim 1 wherein the pressure roller defines an interior and comprises a core within the interior.

The automated fiber placement assembly of any preceding clause wherein the roller heater is positioned within the interior.

The automated fiber placement assembly of any preceding clause wherein the roller heater is arranged as a set of multiple roller heaters positioned within the interior.

The automated fiber placement assembly of any preceding clause wherein each roller heater of the set of multiple roller heaters is pivotable to conform to a shape of the substrate.

The automated fiber placement assembly of any preceding clause further comprising a controller operably coupled to the roller heater for controlling a temperature of the pressure roller.

An automated fiber placement assembly for forming a component on a substrate, the automated fiber placement assembly comprising: a strip of fiber tows; a pressure roller applying the strip of fiber tows to the substrate in a placement direction; and at least one heated roller contacting the strip of fiber tows to apply heat to the strip of fibers.

The automated fiber placement assembly of any preceding clause wherein the at least one heated roller is positioned behind the pressure roller relative to the placement direction.

The automated fiber placement assembly of any preceding clause wherein each heated roller of the at least one heated roller includes a roller heater.

The automated fiber placement assembly of any preceding clause wherein each heated roller of the at least one heated roller includes a temperature sensor.

The automated fiber placement assembly of any preceding clause wherein the at least one heated roller comprises at least two heated rollers, and wherein the at least two heated rollers are heated to different temperatures to define a temperature gradient along the at least two heated rollers.

The automated fiber placement assembly of any preceding clause wherein the at least one heated roller is a preheat roller positioned forward of the pressure roller relative to the placement direction.

The automated fiber placement assembly of any preceding clause further comprising a backpressure roller sandwiching the strip of fiber tows with the preheat roller.

The automated fiber placement assembly of any preceding clause wherein the backpressure roller is a heated backpressure roller.

The automated fiber placement assembly of any preceding clause further comprising a controller operably coupled to the at least one heated roller.

An automated fiber placement assembly for forming a component on a substrate, the automated fiber placement assembly comprising: a fiber tow feeder for feeding a strip of fiber tows toward the substrate in a feed direction; one or more rollers for applying the strip of fiber tows to the substrate in a placement direction, wherein the one or more rollers includes at least a pressure roller for applying a compaction pressure to the strip of fiber tows against the substrate; and one or more roller heaters positioned to heat at least one roller of the one or more rollers such that the at least one roller is at least one heated roller.

The automated fiber placement assembly of any preceding clause, wherein the pressure roller is the at least one heated roller, defining a heated pressure roller.

The automated fiber placement assembly of any preceding clause, further comprising a temperature sensor positioned adjacent to the at least one heated roller.

The automated fiber placement assembly of any preceding clause, wherein the at least one heated roller is rotatable in a rotating direction for applying the strip of fiber tows to the substrate in the feed direction, and wherein the temperature sensor is positioned behind the one or more roller heaters relative to the rotating direction.

The automated fiber placement assembly of any preceding clause, wherein the at least one heated roller is at least two heated rollers.

The automated fiber placement assembly of any preceding clause, wherein each heated roller of the at least two heated rollers has at least one roller heater of the one or more roller heaters positioned for heating each heated roller of the at least two heated rollers.

The automated fiber placement assembly of any preceding clause, wherein the at least one heated roller is positioned against the strip of fiber tows for applying a compaction pressure to the strip of fiber tows against the substrate.

The automated fiber placement assembly of any preceding clause, wherein the at least one heated roller is positioned behind the pressure roller relative to the feed direction.

The automated fiber placement assembly of any preceding clause, wherein the at least one heated roller comprises at least two heated rollers in serial arrangement behind the pressure roller relative to the feed direction.

The automated fiber placement assembly of any preceding clause, wherein the at least one heated roller is at least one preheat roller positioned forward of the pressure roller relative to the feed direction.

The automated fiber placement assembly of any preceding clause, wherein the at least one preheat roller is at least two preheat rollers.

The automated fiber placement assembly of any preceding clause, wherein the at least two preheat rollers are arranged to contact the strip of fiber tows on opposite sides of the strip of fiber tows.

The automated fiber placement assembly of any preceding clause, further comprising a core positioned within an interior of the at least one heated roller.

The automated fiber placement assembly of any preceding clause, wherein the one or more roller heaters are positioned interior of the at least one heated roller.

The automated fiber placement assembly of any preceding clause, wherein the one or more roller heaters are pivotable.

The automated fiber placement assembly of any preceding clause, further comprising a controller operably coupled to the one or more roller heaters for controlling a temperature of the at least one heated roller.

An automated fiber placement assembly for forming a component on a substrate from a strip of fiber tows fed from a fiber tows feeder, the automated fiber placement assembly comprising: one or more rollers including at least a pressure roller; and a roller heater positioned to heat at least one roller of the one or more rollers to define at least one heated roller.

The automated fiber placement assembly of any preceding clause, wherein the pressure roller is the at least one heated roller, defining a heated pressure roller.

The automated fiber placement assembly of any preceding clause, wherein the at least one heated roller is a preheat roller for applying heat prior to the pressure roller.

The automated fiber placement assembly of any preceding clause, further comprising a second pressure roller, wherein the second pressure roller is the at least one heated roller.

A method of forming a component on a substrate with an automated fiber placement assembly by feeding a strip of fiber tows toward the substrate, the method comprising: heating at least one roller for applying the strip of fiber tows to the substrate to define a heated roller.

The method of any preceding clause, wherein the heated roller is a heated pressure roller.

The method of any preceding clause, further comprising applying a compaction pressure to the strip of fiber tows with the heated pressure roller.

The method of any preceding clause, further comprising applying a compaction pressure to the strip of fiber tows with a pressure roller.

The method of any preceding clause, further comprising applying a compaction pressure to the strip of fiber tows with the heated roller after applying the compaction pressure with the pressure roller.

The method of any preceding clause, wherein a roller heater heats the roller.

The method of any preceding clause, further comprising measuring a temperature of the heated roller with a temperature sensor.

The method of any preceding clause, further comprising determining if the temperature matches an intended temperature, is below a maximum temperature, above a minimum temperature, or within a temperature range.

The method of any preceding clause, further comprising adjusting a heat output from the roller heater when the temperature does not match the intended temperature, is not below the maximum temperature, is not above the minimum temperature, or is not within the temperature range.

The method of any preceding clause, further comprising a controller operably coupled to the roller heater to adjust the heat output.

The method of any preceding clause, wherein the heated roller is one of a set of heated rollers.

The method of any preceding clause, wherein the set of heated rollers are a set of heated pressure rollers for applying a compaction pressure to the strip of fiber tows.

The method of any preceding clause, wherein the set of heated pressure rollers have differing temperature to define a temperature gradient among the set of heated pressure rollers.

The method of any preceding clause, wherein the set of multiple heated rollers is a set of preheat rollers.

The method of any preceding clause, wherein the heated roller is a preheat roller.

What is claimed is:

1. An automated fiber placement assembly for forming a component on a substrate, the automated fiber placement assembly comprising:
    a fiber tow feeder for feeding a strip of fiber tows toward the substrate in a feed direction;
    a first pressure roller for applying the strip of fiber tows to the substrate in a placement direction, the first pressure roller being positioned along the strip of fiber tows at the substrate and configured to apply a compaction pressure to the strip of fiber tows against the substrate;
    a second pressure roller positioned behind the first pressure roller relative to the placement direction, the second pressure roller being positioned along the strip of fiber tows at the substrate and configured to apply a compaction pressure to the strip of fiber tows against the substrate;
    a first roller heater positioned to heat the first pressure roller to a first temperature; and
    a second roller heater positioned to heat the second pressure roller to a second temperature,
    wherein the first temperature is different from the second temperature.

2. The automated fiber placement assembly of claim 1, further comprising a temperature sensor positioned adjacent to the first pressure roller.

3. The automated fiber placement assembly of claim 2, wherein the first pressure roller is rotatable in a rotating direction for applying the strip of fiber tows to the substrate in the feed direction, and the temperature sensor is positioned behind the first roller heater relative to the rotating direction.

4. The automated fiber placement assembly of claim 1, further comprising a third pressure roller positioned along the strip of fiber tows at the substrate, wherein the second pressure roller and the third pressure roller are in serial arrangement behind the first pressure roller relative to the feed direction.

5. The automated fiber placement assembly of claim 1, further comprising at least one preheat roller positioned forward of the first pressure roller relative to the feed direction.

6. The automated fiber placement assembly of claim 5, wherein the at least one preheat roller is at least two preheat rollers.

7. The automated fiber placement assembly of claim 6, wherein the at least two preheat rollers are arranged to contact the strip of fiber tows on opposite surfaces of the strip of fiber tows.

8. The automated fiber placement assembly of claim 1, further comprising a core positioned within an interior of the first pressure roller.

9. The automated fiber placement assembly of claim 8, wherein the first roller heater is positioned within the interior of the first pressure roller to heat the core.

10. The automated fiber placement assembly of claim 9, wherein the first roller heater is pivotable, relative to the first pressure roller.

11. The automated fiber placement assembly of claim 1, further comprising a controller operably coupled to the first roller heater for controlling a temperature of the first pressure roller.

12. An automated fiber placement assembly for forming a component on a substrate from a strip of fiber tows fed from a fiber tows feeder, the automated fiber placement assembly comprising:
    one or more pressure rollers configured to provide a compaction pressure to the strip of fiber tows at the substrate, the one or more pressure rollers each having a contact surface that contacts the strip of fiber tows; and
    a roller heater positioned within an interior of at least one pressure roller of the one or more pressure rollers to heat the at least one pressure roller and define at least one heated pressure roller,
    wherein the contact surface can deform complementary to the strip of fibers and the roller heater is pivotable relative to the contact surface.

13. The automated fiber placement assembly of claim 12, further comprising a preheat roller positioned to heat the strip of fiber tows prior to the at least one heated pressure roller.

14. The automated fiber placement assembly of claim 12, further comprising a second roller heater heating a second pressure roller of the one or more pressure rollers to define at least two heated pressure rollers.

15. The automated fiber placement assembly of claim 14, wherein the second roller heater is configured to heat the second pressure roller to a different temperature than that of another pressure roller of the at least two heated pressure rollers.

16. An automated fiber placement assembly for forming a component on a substrate, the automated fiber placement assembly comprising:
    a fiber tow feeder for feeding a strip of fiber tows toward the substrate in a feed direction;
    a pressure roller for applying the strip of fiber tows to the substrate in a placement direction, the pressure roller including an outer wall and a core, the core being located within the outer wall and spaced from the outer wall by a pliable material, the pressure roller being positioned along the strip of fiber tows at the substrate and configured to apply a compaction pressure to the strip of fiber tows against the substrate; and a roller heater positioned to heat the core, wherein the core distributes heat through the pliable material to the outer wall.

17. The automated fiber placement assembly of claim 16, wherein the roller heater is positioned interior of the core, and the core is annular about a rotational axis of the pressure roller.

18. The automated fiber placement assembly of claim 17, further comprising an additional section of pliable material, wherein the additional section of pliable material spaces the core from the roller heater.

19. The automated fiber placement assembly of claim 17, wherein the core includes one or more discrete segments.

20. The automated fiber placement assembly of claim 16, wherein the roller heater is separate from the core.

* * * * *